United States Patent [19]
Bonesteel

[11] Patent Number: 5,458,314
[45] Date of Patent: Oct. 17, 1995

[54] TEMPERATURE CONTROL IN AN ULTRA LIGHT ENGINE VALVE

[75] Inventor: David L. Bonesteel, Richland, Mich.

[73] Assignee: Eaton Corporation, Cleveland, Ohio

[21] Appl. No.: 328,800

[22] Filed: Oct. 31, 1994

Related U.S. Application Data

[63] Continuation-in-part of Ser. No. 41,749, Apr. 1, 1993.
[51] Int. Cl.[6] ........................................ F01L 3/20
[52] U.S. Cl. .................. 251/337; 123/188.3; 123/188.9; 29/888.45
[58] Field of Search ................ 123/188.1, 188.2, 123/188.3, 188.9; 29/888.45, 888.451, 888.452, 888.453; 251/337, 356, 367

[56] References Cited

U.S. PATENT DOCUMENTS

| | | |
|---|---|---|
| 1,786,285 | 12/1930 | Bissell . |
| 1,823,452 | 9/1931 | Heron . |
| 2,009,045 | 7/1935 | Flintermann ............... 29/888.45 |
| 2,009,996 | 8/1935 | Gering, Jr. ............... 29/888.451 |
| 2,030,500 | 2/1936 | Colwell ...................... 29/156.7 |
| 2,070,102 | 2/1937 | Weslake .................... 29/888.45 |
| 2,371,548 | 3/1945 | Saffady ...................... 123/188.3 |
| 4,147,138 | 4/1979 | Haug ......................... 123/188.3 |
| 4,164,957 | 8/1979 | Goloff ....................... 123/188.3 |
| 4,928,645 | 5/1990 | Berneborg et al. ........ 123/188.3 |
| 5,056,219 | 10/1991 | Iwase ........................ 123/188.3 |

Primary Examiner—Henry C. Yuen
Assistant Examiner—Erick Solis
Attorney, Agent, or Firm—Frank M. Sajovec

[57] ABSTRACT

An ultra light weight poppet valve which includes elements for controlling the temperature of the valve during operation. The valve is of the type which is formed as an elongated cup having a flared open end to which a cap is fixed and in which an extremely thin-wall section is maintained all the way to a closed tip end. Temperature control elements include multiple thin-walled elements in nesting relationship to define multiple interior chambers, and a plug member received within the stem portion of the valve and maintained in place by inwardly deflecting the stem portion.

9 Claims, 2 Drawing Sheets

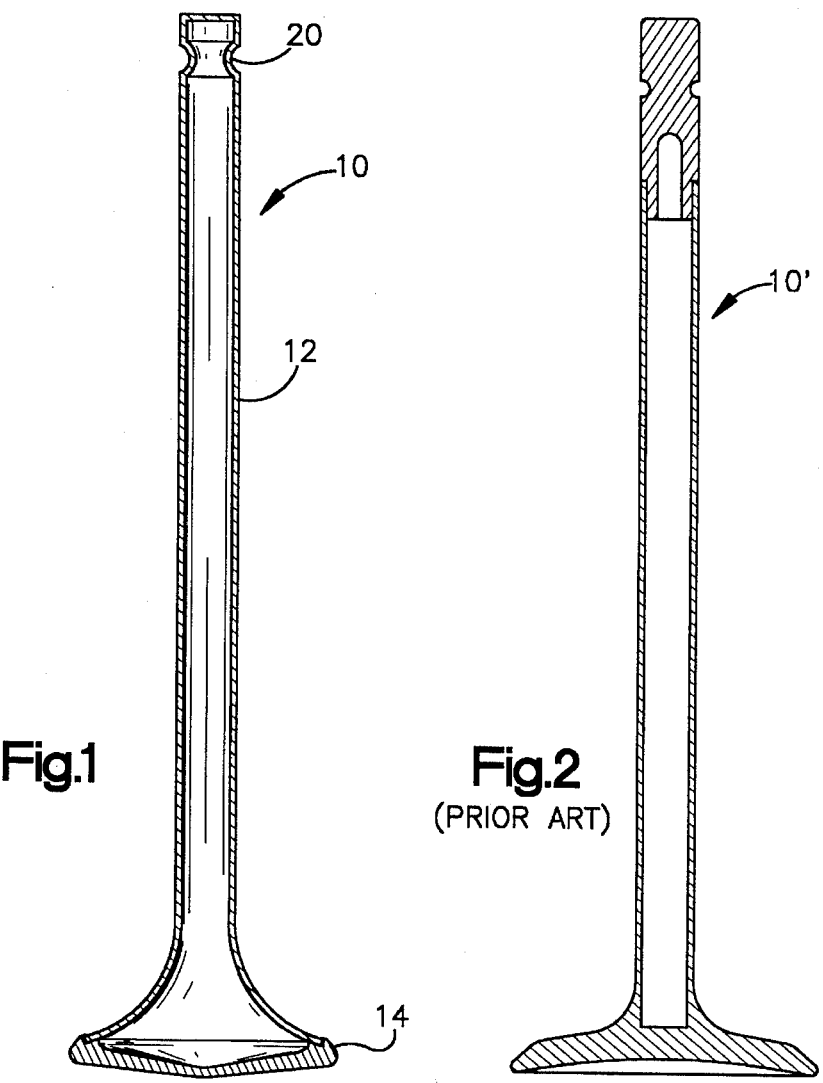
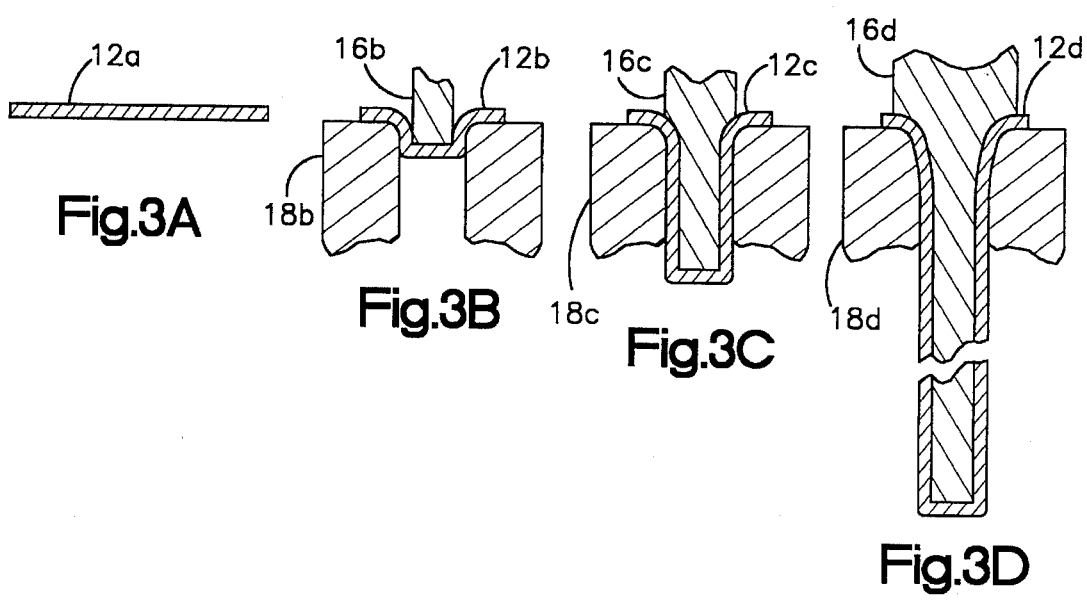

TEMPERATURE CONTROL IN AN ULTRA LIGHT ENGINE VALVE

This application is a continuation-in-part of application Ser. No. 08/041,749 filed Apr. 1, 1993 and titled "Ultra Light Engine Valve".

The present invention relates generally to light weight poppet valves for internal combustion engines, and more particularly to the control of temperature in a valve which is of exceptionally light weight.

Internal combustion engine poppet valves are most commonly fabricated by machining, forging or extruding a solid blank of high-strength, heat resistant metal and then subjecting the blank to finish machining and/or grinding operations. In some applications, performance requirements make it necessary to provide a valve having a hollow stem into which a coolant such as sodium may be added during the fabrication process. In the prior art, such hollow stems have been formed by means such as drilling the stem or by extruding or forging the stem over a mandrel or a removable core. U.S. patent application Ser. No. 041,749, discloses a poppet valve which comprises a stem element which includes an integral tip and fillet portion and a cap which is preferably welded to the stem element. The stem element is in the form of a cup having a flared open end defining the fillet region of the valve and a closed end defining the tip, and is hollow all the way to the tip; and wherein the wall section of the stem element is relatively thick in the fillet region, tapers down to a substantially uniform thickness for the rest of the length of the stem, and is again relatively thick at the tip end. The stem element is fabricated by means of a deep drawing process wherein a starting blank in the form of a sheet-like disk is subjected to a plurality of cold drawing steps which result in an elongated flared cup wherein the outer edge of the flared end and the tip end are substantially of the thickness of the starting blank. One or more keeper grooves are rolled into the hollow stem as an added step to the drawing process.

Hollow exhaust valves to which a coolant is added are known in the art, as are hollow exhaust valves which have multiple chambers for the addition of multiple coolants. The deep drawing process greatly simplifies the formation of multiple chambers in a hollow valve.

The fabrication of the valve by a deep drawing process also makes practical a valve structure which includes multiple walls with an air gap between the walls to define a thermal barrier.

Other objects and advantages of the invention will be apparent from the following description when considered in connection with the accompanying drawings, wherein;

FIG. 1 is a sectional view of an ultra light valve;

FIG. 2 is a sectional view of a prior art hollow valve;

FIGS. 3A–3D illustrate a deep drawing process for forming ultra light valves;

Figure 4:
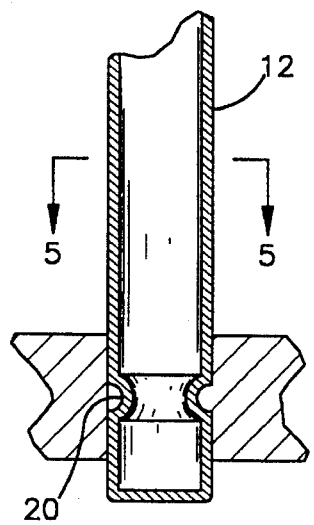
FIG. 4 is a fragmentary sectional view showing a method for forming a groove in the stem region of the valve.
Figure 5:
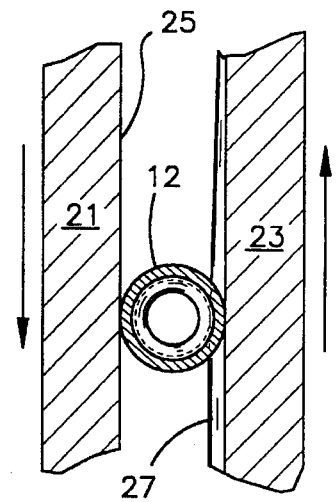
FIG. 5 is a sectional view taken along line 5—5 of FIG. 4.

Referring to FIG. 1, there is illustrated a poppet valve 10 comprising a stem element 12 and a cap element 14 which is welded or otherwise joined to the stem element. As described in detail in application Ser. No. 041,749, the stem element 12 is formed by a cold forming process, as illustrated in FIGS. 3A–3D, wherein formation of the stem progresses from a disk 12a through a series of deep drawing steps in which plungers or mandrels 16b–16d are engaged with the blank while it is supported in dies 18b–18d to form the blank through stages designated 12b–12d into a shape near to the final shape shown in FIG. 1. Additional drawing steps are then applied to arrive at the final shape. Referring to FIGS. 4 and 5 the stem element 12 can also be subjected to a step wherein the keeper groove 20 is formed as a part of the cold forming process. In this step, the workpiece in its early completed form is transferred to a station wherein the workpiece is received between two dies 21 and 23 which are geared or otherwise linked together to move in opposite directions, as indicated by the arrows in FIG. 5, to roll the workpiece between them. To form the groove 20, the die 21 has a knurled or other high friction surface 25 formed thereon to grip the workpiece, and the die 23 has a projection 27 thereon in the form of a ramp to displace the material of the workpiece wall to form the keeper groove. Other methods of forming the groove can also be used, including a plurality of radially movable circular dies in surrounding relation to the workpiece. Because of the displacement of the material, the final steps to insure the shape of the tip end as well as to obtain the final dimensions of the stem portion are carried out after the groove rolling step. A single groove is shown herein; however, it can be appreciated that multiple grooves of varied shape can be formed if required for a particular engine design, or to provide additional stiffness. The final stem element 12 which results from the above process is characterized by an integral tip end and by a very thin wall through the length of the straight portion of the stem but wherein the thickness in the areas of the fillet and the tip respectively are essentially the thickness of the original metal sheet 12a in FIG. 3A. The addition of the cap 14 results in a valve structure of extremely light weight which has a very large interior volume as compared with prior art light weight valves. A typical example of a prior art light weight, hollow valve 10' is shown in FIG. 2 for comparison.

Figures 6, 7, 8:
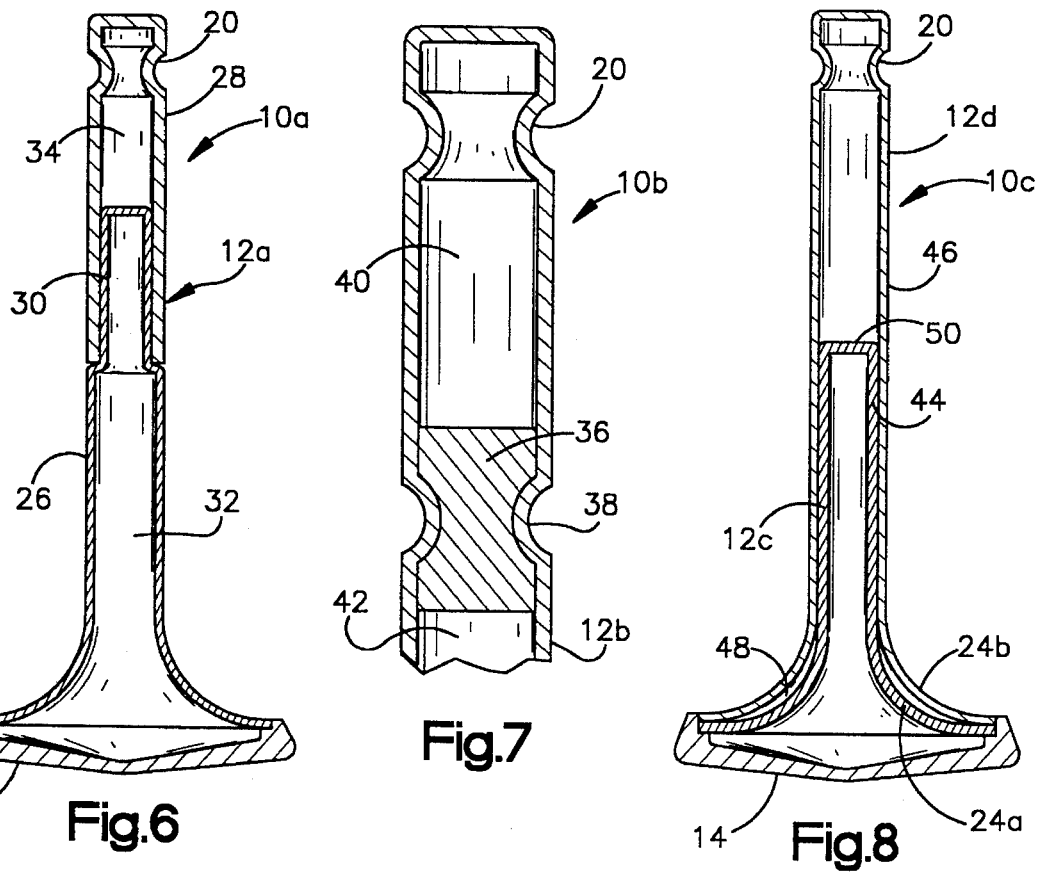
FIG. 6 is a sectional view of a first embodiment of an ultra light valve having plural coolant chambers.
FIG. 7 is a fragmentary sectional view of a second embodiment of an ultra light valve having plural coolant chambers.
FIG. 8 is a sectional view of an ultra light valve incorporating a thermal barrier.

FIG. 6 illustrates an embodiment of a hollow valve 10a which takes advantage of the use of the deep drawing process to produce a thin-walled and very light weight structure. In this embodiment the stem portion 12a is formed in two pieces, a lower element 26 which includes the fillet region, and an upper element 28, in which the keeper groove 20 is formed. The lower element is formed, preferably by deep drawing as illustrated in FIGS. 3A–3D with an area of reduced diameter 30 over which the upper element 26 is fitted. The two elements are preferably joined by welding, and a cap 14 is applied as in the FIG. 1 structure to provide a complete valve. The two-piece stem structure provides several desirable features. The valve assembly has a first cavity 32 which can be partially filled with a first coolant such as sodium potassium, and a second cavity 34 which can be partially filled with a second coolant such as water, whereby the first coolant cools the head portion of the exhaust valve, which is subjected to very high temperatures, and the second coolant cools the relatively lower temperature stem portion.

Another advantage of the two-piece stem design shown in FIG. 6 is that it permits the use of different materials for the tip and fillet ends of the valve. Accordingly, a heat and corrosion resistant material such as 305 stainless steel can be used at the fillet end where high temperature corrosion resistance is an important consideration, while a hardenable alloy such as carbon steel can be used at the tip end where wear resistance and stiffness are important but heat and corrosion resistance are not. A further advantage of this configuration is that it permits the fabrication of longer valve stems than would be possible with a single piece stem element since there is a practical limit to how long a given blank can be drawn.

The embodiment illustrated in FIG. 7 is a variation of the multiple chamber aspect of the FIG. 6 embodiment. In this embodiment the finished valve structure 10b is essentially the same as the FIG. 1 embodiment. As in the FIG. 1 embodiment a single piece stem portion 12b is utilized; however a plug 36 is inserted in the stem after the stem is deep drawn, and is preferably retained by rolling in one or more grooves 38 similar to the keeper groove 20 by a process such as that illustrated in FIGS. 4 and 5. The plug can also be retained by other means such as welding, the only critical requirements of the plug being that it forms a seal with the interior surface of the stem and that it be compatible with the temperature to which the valve is subjected. In the preferred embodiment illustrated the plug is aluminum and is formed in the shape shown prior to insertion. In this embodiment a first coolant can be put into the cavity 40 prior to the insertion of the plug, and a second coolant put into the cavity 42 after insertion and fixing of the plug.

The embodiment shown in FIG. 8, provides a valve 10c which is made up of an inner deep drawn member 44 and an outer deep drawn member 46. The inner member 44 includes a stem portion 12c and a fillet portion 24a to which the cap element 14 is attached, preferably by welding. The outer member 46 includes a stem portion 12d, a fillet portion 24b and a tip portion which includes the keeper groove 20, In this embodiment the inner and outer members 44 and 46 are formed with an air gap designated as element 48 in the fillet region. The air gap, which is preferably from 0.25 mm to 1.0 mm serves to provide a thermal conductivity barrier between the members. In the preferred embodiment the inner member 44 is in sealing relation to the outer member 46 at or adjacent to the closed end 50 of the inner member. The outer edges of the fillet portions 24a and 24b can also be sealed in the process of welding on the cap 14.

In all of the embodiments illustrated herein, the wall thickness of the various deep drawn elements will vary according to the overall size of the valve and the type of engine to which it is applied. A valve of typical proportions configured as shown in FIG. I for a passenger can engine application would have the following dimensions:

| | | |
|---|---|---|
| Head diameter | 28 mm | |
| Stem O.D. | 6 mm | |
| Stem I.D. | 5 mm | |
| Minimum wall thickness | 0.5 mm | |
| Empty weight | 17 g | |

I claim:

1. An ultra light internal combustion engine poppet valve comprising a stem portion, a cap portion, a tip portion and a flared fillet portion defining a transition region between said stem portion and said cap portion; characterized by said stem portion, tip portion and fillet portion being formed by first and second interfitting thin-walled cylindrical members open at one end and closed at the other end with the thin wall extending the full length of the cylindrical member including the closed end thereof; said first cylindrical member defining said fillet portion and a part of said stem portion and being formed with an area of reduced diameter adjacent the closed end thereof; and said second cylindrical member being received over said first element and defining the remainder of said stem portion and said tip portion; said first and second cylindrical members defining first and second chambers within said poppet valve.

2. A valve as claimed in claim 1, including one or more grooves formed in said second cylindrical member adjacent the closed end thereof, 3. An ultra light internal combustion engine poppet valve comprising a stem portion, a cap portion, a tip portion and a flared fillet portion defining a transition region between said stem portion and said cap portion; said cap portion being defined by a disk-like cap member fixed to said fillet portion and said stem portion, and said tip portion and said fillet portion being defined by a one-piece thin-walled cylindrical member which is open at the fillet end thereof and closed at the tip end; the thin wall of the stem portion extending the full length of said stem portion to the intersection of the stem portion with the tip portion; characterized by a plug element received within said stem portion, said plug element defining first and second chambers within the interior of said poppet valve.

4. A valve as claimed in claim 3 wherein said plug is retained within said stem portion by deflecting the wall of said stem portion inward in the area where said plug is received.

5. A valve as claimed in either of claims 3 or 4, including one or more grooves formed in said stem portion adjacent the tip end thereof.

6. An ultra light internal combustion engine poppet valve comprising an outer thin walled hollow element and an inner thin-walled hollow element nested within the outer element, each of said elements having a flared open end, an elongated, cylindrical central section, and a closed tip end; and a cap member fixed to said outer element; characterized by said inner element being in sealing engagement with said outer element such that an interior of said inner element is sealed from an interior of said outer element but with at least a portion of its outer surface spaced from the inner surface of said outer element.

7. A valve as claimed in claim 6, in which each of said inner and outer elements is defined by a one-piece, thin-walled cylindrical member which is open at the flared end thereof and closed at the tip end; the thin wall of the stem portion extending the full length of said stem portion to the intersection of the stem portion with the tip portion.

8. A valve as claimed in claim 6 including one or more grooves formed in said outer element adjacent the tip end thereof.

9. A valve as claimed in claims 6, 7 or 8 in which said inner and outer elements define first and second chambers within said valve.

* * * * *